Figure 1:
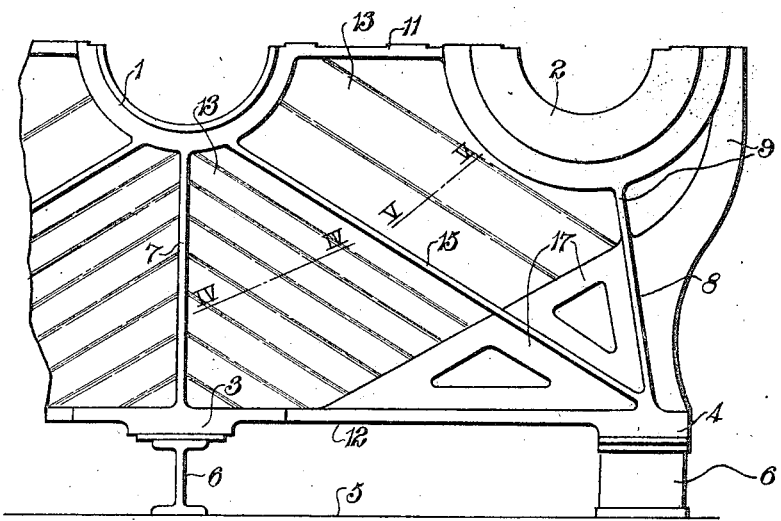

Feb. 26, 1924.

H. L. GUY ET AL 1,484,942

GEAR CASING

Filed Feb. 18, 1922    2 Sheets-Sheet 1

Witnesses:-
R. B. Wakefield

Inventor
William Eccles and
Henry Lewis Guy
By D. C. Davis
Attorney.

Patented Feb. 26, 1924.

1,484,942

UNITED STATES PATENT OFFICE.

HENRY LEWIS GUY, OF MANCHESTER, AND WILLIAM ECCLES, OF CHORLTON-CUM-HARDY, ENGLAND, ASSIGNORS, BY MESNE ASSIGNMENTS, TO WESTINGHOUSE ELECTRIC AND MANUFACTURING COMPANY, A CORPORATION OF PENNSYLVANIA.

GEAR CASING.

Application filed February 18, 1922. Serial No. 537,603.

*To all whom it may concern:*

Be it known that we, HENRY LEWIS GUY, a resident of Manchester, in the county of Lancaster, England, and WILLIAM ECCLES, a resident of Chorlton-cum-Hardy, in the county of Lancaster, England, both subjects of the King of Great Britain, have invented new and useful Improvements in Gear Casings, of which the following is a specification.

This invention relates to gear case structures, for enclosing the gears and supporting the shafts of toothed reduction gears and in particular to structures in which a central shaft carries one or more large gear wheels with a shaft on each side and parallel therewith carrying pinions or gear wheels engaging with the central gear or gears.

Gear case structures for the purpose above mentioned have to be made sufficiently strong to support not only the weight of the shafts, gears and pinions but also to resist the thrust which is transmitted through the gear teeth to the shafts and from thence to the bearings. It is also necessary that the side shafts should each be capable of independent rotational movement in substantially vertical planes containing their axes in order that the pressure between the gear teeth shall be substantially equalized across the faces of the teeth notwithstanding irregularities in the tooth form and to compensate for uneven wear of bearings. It is furthermore necessary that twisting stresses about axes perpendicular to the axes of the shafts should not be transmissible between the floor or supporting foundation and the shaft bearings, so that, on the one hand, distortion of the floor or foundation should not cause an alteration in the co-planar condition of the shafts which would alter distribution of the tooth pressures and on the other hand, alteration in the positions of the shafts due to variations in tooth pressure as above-mentioned should not be transmitted to and resisted by the supporting floor or foundation.

According to the present invention in order to attain the above objects, the gear case is so constructed as to allow such small movements of the side shafts in approximately vertical planes as will permit the tooth pressure to be equalized and the structure is also connected to the floor or foundation through four seatings, two of which, termed the central seatings, are in a vertical plane containing the axis of the central shaft and the other two, termed the side seatings, are in a vertical plane perpendicular to said axis and approximately midway between the bearings of the side shafts. The connections between the seatings forming part of the gear case structure and the supporting floor or foundation are of a flexible nature such as will permit of rotation in a substantially vertical plane containing the line connecting the two central seatings and in a substantially vertical plane containing the line connecting the two side seatings, respectively. The bearings of the central shaft are connected to the central seatings which may conveniently be located vertically below them by substantially rigid struts at each end of the gear case. The bearings for each side shaft are connected together and to the respective side seatings by a beam or structure which is designed to be stiff in the plane containing the bearings and the side seating but which as above mentioned can rock on the side seating. Such a structure may be Y- or V-form for example, the bearings being located at the extremities of the two upper or inclined limbs and the seating at the end of the lower limb of the Y—or at the point of the V. Preferably the side seatings will be displaced laterally in a direction away from the central shaft. A connection will be made between each side bearing and the central bearing at the same end of the gear case, and also between each side seating and the central seatings, but these connections are designed so as not to interfere with the movement of the side shaft in a vertical plane. The spaces at each end of the gear case will be enclosed by sheets which are arranged so as to be flexible in the desired direction, that is to permit the aforementioned movement of the side shafts, for which purpose one or more corrugations or folds may be provided therein and the bottom and the top of the gear case will also be enclosed by sheets designed to permit of the desired movement of the side shafts. The sides of the gear case will be formed by the beams which support the side bearings as above described.

In order to prevent the gear case from collapsing in a sidewise direction some additional stays are desirable. These consist of diagonal members which connect the central bearings to the lower ends of the Y or V beams on each side. Furthermore, the inclined limbs of the Y or V beams may be connected by triangular webs and triangular stiffening webs may also be provided between Y or V beams and the side seatings or the lower horizontal members which connect each side seating, that is to say the lower end of each Y or V beam with the central seatings, namely the lower ends of the vertical struts. These last mentioned stiffening webs may be connected with the diagonal members when present.

Figure 3:
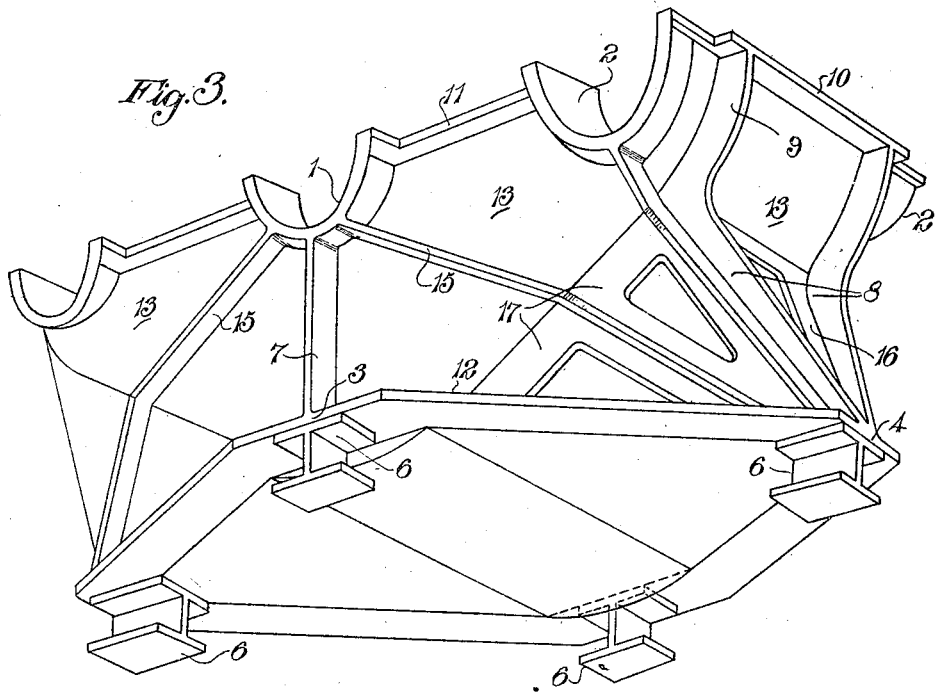
Figure 2:
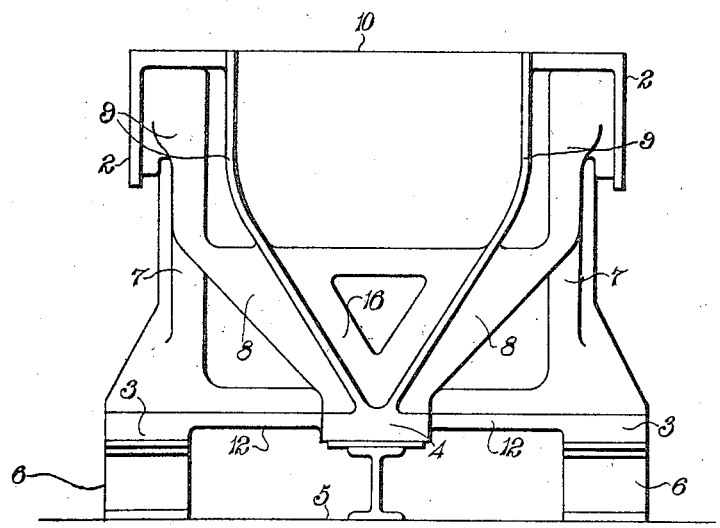
Figure 4:
Figure 5:

In order that the nature of the invention may be clearly understood, reference may be had to the accompanying drawings, in which Fig. 1 is an end view of the lower portion of a gear case, the left-hand part being broken away, and Fig. 2 is a side view of the same; Fig. 3 is a perspective view looked at from below and somewhat diagrammatic of a gear case such as shown in Fig. 1; Fig. 4 is a section on the line IV—IV, Fig. 1, and Fig. 5 is a section on the line V—V of Fig. 1, both drawn to an enlarged scale.

The gear case structure illustrated is one in which three parallel shafts are intended to be mounted in a horizontal plane. The bearings for the central shaft are indicated at 1 and those for the right-hand side shaft at 2; the left-hand side shaft bearings are not shown. The seatings of the gear case are four in number, two of which, termed the cetnral seatings, are indicated at 3 located substantially vertically below the bearings of the central shaft, the other two seatings, called side seatings, are located in a line perpendicular to and midway between the central seatings 3, one of these side seatings being indicated at 4. The connections between the seatings and the floor or foundation 5 are of a flexible nature and as indicated for example in Figs. 1 and 2 may consist of sections of I-beams 6, but other flexible connections may be employed such as indicated for example in our application Serial No. 537,602 of even date herewith. These flexible connections are for the purpose of preventing twisting stresses being communicated from the floor of foundation to the gear case which might result in the shafts being moved from their co-planar positions and thereby cause undue wear and stresses on the teeth of the gear wheels mounted thereon.

The main framework or supporting members of the gear case structure consist of the vertical struts 7 which connect the bearings 1 of the central shaft to the central seatings or feet 3 which are located substantially immediately below said bearings and a strut structure formed somewhat in the shape of a Y or V indicated generally at 8, the shape of which is shown clearly in Figs. 2 and 3, which connects the side bearings 2 with the respective side seatings or feet 4 on each side of the gear case. The upper ends 9 of the V or Y beam strut structure are formed integral with or connected firmly to the side bearings 2, which are themselves connected together by a tie 10. The side bearings 2 are connected to the central bearings 1 at each end of the gear case by substantially horizontal tie members 11 and the lower parts of the Y or V beams 8 or side seatings 4 are also connected by other horizontal members 12 to the lower parts of the vertical struts or to the central seatings 3 at each end of the gear case, respectively. The spaces between the various members thus forming the skeleton of the gear case are covered in with sheets 13 which are arranged so as to be flexible in the desired direction. As indicated by the shade lines in Figs. 1 and 3 and as shown by the sections in Figs. 4 and 5, said sheets may be provided with corrugations or folds 14 therein so that slight movements of the side shafts in a vertical plane containing their axes will not be prevented. The sheets will extend from one end to the other underneath the gear case and will also be extended so as to close in the spaces between the inclined limbs of the Y or V beams at the sides. The form of the corrugations shown in Figs. 4 and 5 is purely diagrammatic and, generally speaking, the sheets are usually sufficiently thin to offer very little resistance to bending and only sufficient to enclose the gears and shafts and to prevent oil from escaping.

In addition to the struts and members forming the main framework of the gear case above described, a diagonal member 15 is preferably provided connecting each central bearing 1 to the lower part of the Y or V beam 8 or side seating 4 on each side. This will materially assist in preventing the gear case from collapsing in a sidewise direction.

Additional stiffness may be provided without interferring with the desired movements of the side shafts in a vertical plane by triangular stiffening webs, one of which is shown at 16 in Figs. 2 and 3, between the limbs of the V beams 8 and between said limbs and the lower horizontal members 12 as shown at 17, and in some cases these last mentioned webs may be united to and merged into the diagonal members 15 when these are provided.

Where the structure which supports the side bearings is more of a Y shape than is shown in the drawings in which it is more V-shaped, the central upright limb of the Y may be united to side seating 6 which for this purpose is extended towards the centre as hereinafter described, by means of a single triangular web in a vertical plane, it being immaterial whether the inclined side of the web is joined or not to the sheet which encloses the gears. The junction point of the three limbs of the Y should in this case be made sufficiently strong and rigid to prevent bending in the plane of the triangular web.

The upper part or top of the gear case which is not shown in the drawings may be formed in any suitable manner as it does not have to support the weight of the shafts or to take any important stresses and usually the lower portion of the gear case towards the centre will be formed by a concave tray, so as to afford accommodation for the large wheel which is usually mounted on the central shaft. It will be understood that the drawings hereinbefore described are largely diagrammatic and are only intended to indicate the general construction of the principal members forming the gear case through which the various stresses are transmitted to the seatings and that no attempt is made to indicate the relative sizes, which will obviously be a matter for calculation or the actual shapes of such members but only the relative positions thereof.

The central seatings and the side seatings respectively may be extended towards the centre of the structure so as to form in effect a cruciform seating. Usually however the central portion of such a cruciform seating will be removed in order to give space for the large gear wheel mounted on the central shaft. It is obvious that such extension of the seatings will not affect the transmission of twisting stresses between the foundation and the gear case structure. It will be understood that the term flexible is used in a comparative sense, the movements of the shafts being comparatively small.

The entire gear case will preferably be formed of one or more cast portions, in which case the requisite stiffness will be given in the desired directions by means of flanges or ribs and the flexibility will be obtained by the provision of corrugations or by giving a suitable curved form to the webs connecting the flanged portions or ribs.

The invention is not limited to the precise structure shown in the drawings, but is susceptible of considerable variation in detail as will be understood by engineers skilled in the art.

We claim as our invention:—

1. In a gear case structure, in combination, a plurality of bearings, struts for supporting the bearings, a plurality of other bearings, and strut structure including converging branches for supporting the latter bearings.

2. In a gear case structure, in combination, a plurality of bearings, struts for supporting the bearings, a plurality of other bearings, strut structure including converging branches for supporting the latter bearings, and tie members between the first and second bearings.

3. In a gear case structure, in combination, a plurality of bearings, struts for supporting the bearings, a plurality of other bearings, a strut including converging branches for supporting the latter bearings, tie members between the first and second bearings, and diagonal bracing structure arranged between said struts to prevent collapsing of the gear case structure.

4. In a gear case structure, in combination, a plurality of aligned bearings, supporting struts for the bearings, a plurality of other aligned bearings, a strut structure having upper branches which support the latter bearings, and tie members between the first and second sets of bearings.

5. In a gear case structure, in combination, a plurality of aligned bearings, supporting struts for the bearings, a plurality of other aligned bearings arranged substantially parallel to the first bearings, a strut structure having upper branches which support the latter bearings, and tiltable means for supporting the latter strut structure and which has its axis of tilt extending transversely of the axes of said bearings.

6. In a gear case structure, in combination, a plurality of aligned bearings, supporting struts for the bearings, a plurality of other aligned bearings, a strut structure having upper branches which support the latter bearings, tiltable means for supporting the latter strut structure whose axis of tilt is transverse to the axes of the bearings, and corrugated casing members whose corrugations extend transversely to the plane of tilt of said second bearings.

7. In a gear case structure, in combination, a plurality of aligned bearings, struts for supporting the bearings, aligned tiltable means for supporting the struts whose axis of tilt is in the vertical plane of the bearings, a plurality of other aligned bearings, a strut structure having upper branches which support the latter bearings, and means for supporting the latter strut structure and whose axis of tilt is transverse to the axes of the bearings.

8. In a gear case structure, in combination, a plurality of aligned bearings, supporting struts for the bearings terminating in feet at the lower ends thereof, supporting means for said feet, a plurality of other aligned bearings, a strut having upper branches which support the latter bearings and terminating in a lower foot, tie members between the first and second bearings and between the first struts and the second strut, and diagonal bracing means between the first and second struts.

9. In a gear case structure, in combination, a plurality of aligned bearings, supporting struts for the bearings having feet at the lower end thereof, I-beam sections for supporting said feet and having the webs thereof in the vertical plane of said bearings, a plurality of other aligned bearings, a strut having upper branches which support the latter bearings and terminating in a lower foot, and an I-beam section for supporting the latter foot and having its web arranged in a plane substantially normal to the axes of the bearings.

10. In a gear case structure, in combination, a plurality of aligned bearings, supporting struts for the bearings having feet at their lower ends, sets of aligned bearings disposed laterally and in parallelism to the axis of the first bearings, struts having upper branches for supporting the latter sets of bearings each of which terminates in a foot at its lower end, tie members between the central and lateral bearings, tie members between the feet of the struts, I-beam sections for supporting the first struts and having the webs thereof arranged in the vertical plane of the first bearings, and I-beam sections for supporting the feet of the second struts and having their webs arranged substantially normal to the axis of said bearings.

11. In a gear case structure, in combination, a plurality of centrally-disposed and aligned bearings, supporting struts for the bearings terminating in feet at their lower ends, laterally-disposed sets of aligned bearings, struts for supporting the latter sets of bearings and terminating in feet at their lower ends, tie members for connecting the centrally to the laterally-disposed bearings, tie members for connecting the strut feet, and diagonal bracing means between the central and lateral struts to oppose collapsing of the gear case structure.

12. In a gear case structure, the combination of a plurality of aligned bearings, struts for supporting the bearings, a plurality of other aligned bearings, a strut having a V-portion the limbs of which support the latter bearings, and a stiffening web between the limbs.

13. In a gear case structure, the combination of a plurality of centrally-disposed bearings, struts for supporting said bearings, lateral groups of aligned bearings whose axes are parallel to the axis of the central bearings, lateral struts having V-portions the limbs each of which support a group of lateral bearings, and strengthening webs connecting the V-portions.

In testimony whereof we have hereunto subscribed our names this twenty-fourth day of January, 1922.

HENRY LEWIS GUY.
WILLIAM ECCLES.